(12) United States Patent
Yoshioka et al.

(10) Patent No.: US 7,360,825 B2
(45) Date of Patent: *Apr. 22, 2008

(54) DRIP MOLDING FOR VEHICLE, HAVING FURNISHING LIP PART BENDING TOWARD WINDOWPANE

(75) Inventors: Junichi Yoshioka, Utsunomiya (JP); Masayuki Watarai, Utsunomiya (JP); Shuhei Hamada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/538,951

(22) Filed: Oct. 5, 2006

(65) Prior Publication Data

US 2007/0090668 A1   Apr. 26, 2007

(30) Foreign Application Priority Data

Oct. 20, 2005   (JP) .............................. 2005-305447

(51) Int. Cl.
*B62D 25/00* (2006.01)
(52) U.S. Cl. .................................. 296/203.03; 296/205
(58) Field of Classification Search .................. 296/93, 296/208
See application file for complete search history.

(56) References Cited

U.S. PATENT DOCUMENTS 7,118,169 B2 * 10/2006 Hara et al. ................... 296/208
7,168,756 B2 * 1/2007 Hasegawa et al. ...... 296/203.03
2006/0049669 A1 * 3/2006 Yamamoto ................... 296/201

FOREIGN PATENT DOCUMENTS

JP          10-058967          3/1998

* cited by examiner

*Primary Examiner*—Joseph D Pape
(74) *Attorney, Agent, or Firm*—Rankin, Hill & Clark LLP

(57) ABSTRACT

A drip molding supported by a pillar at a corner of the front or back of a vehicle, for draining waterdrops entering a side edge of a front or back windowpane. The drip molding has a base attached to the pillar; a part for sealing a gap between the base and the side edge; and a lip part extending from the base to the front surface of the windowpane to form a drainage path between the lip part and the windowpane. On the outside of the lip part, a bent surface is arranged so as to form an arc bending toward the front surface of the windowpane, and an inner face of the lip part is formed in a manner such that the larger a distance from the head toward the root of this part, the larger the distance between this inner face and the front surface of the windowpane.

3 Claims, 4 Drawing Sheets

DRIP MOLDING FOR VEHICLE, HAVING FURNISHING LIP PART BENDING TOWARD WINDOWPANE

BACKGROUND OF THE INVENTION

1. Field of the Invention

The present invention relates to a drip molding for a vehicle, which is used for draining waterdrops which enter a side edge of a windowpane on the front or back side of the vehicle.

Priority is claimed on Japanese Patent Application No. 2005-305447, filed Oct. 20, 2005, the content of which is incorporated herein by reference.

2. Description of the Related Art

Generally, a drip molding having a function of draining raindrops or the like is arranged at a side edge of a front windowpane of a vehicle. The drip molding has an attachment base which is attached to a front pillar, and from the attachment base, a glass pane (i.e., windowpane) sealing part and a furnishing lip part extend. The glass pane sealing part is disposed so as to be in close contact with the front surface of a side edge of the front windowpane, and the furnishing lip part projects toward the front surface of the front windowpane 6 so as to form a canopy, thereby forming a drainage path having a substantially U-shaped section between the inner face of the furnishing lip part and the front windowpane.

It is desirable that this type of drip molding have a larger capacity drainage path, so as to reliably catch rainwater which enters a side edge of a windowpane due to the movement of a wiper or an air current occurring during the running of the vehicle.

In response to the above request, a drip molding having a furnishing lip part which is arranged at a high position (i.e., having a larger distance from the windowpane), or a drip molding in which a larger angle is formed between the windowpane and the furnishing lip part has been proposed (see Japanese Unexamined Patent Application, First Publication No. H10-58967).

However, in such a drip molding, the drainage path has a larger capacity due to increase in the height or angle of the furnishing lip part to be arranged; thus, the distance from the front surface of the windowpane to the head of the furnishing lip part increases in accordance with an increase in the capacity of the drainage path. Additionally, when this distance increases, part of the air current drawn from the front surface of the windowpane to either side of the vehicle body is separated at the furnishing lip part, which tends to cause a wind-cutting sound.

Therefore, conventionally, a wide area of the outer face of the pillar joined to the furnishing lip part is smoothly bent, so as to adjust turbulent flow occurring at the furnishing lip part by using the bent surface of the pillar.

However, recently, a narrower outer face of the pillar is sometimes desired in order to secure sufficient visibility or due to a demand relating to the design of the vehicle body. In this case, it is difficult to sufficiently suppress the turbulent flow on the outer face of the pillar. Therefore, actually, it is difficult to simultaneously: (i) secure a sufficient capacity of the drainage path; and (ii) prevent the occurrence of a wind-cutting sound.

SUMMARY OF THE INVENTION

In light of the above circumstances, an object of the present invention is to provide a drip molding for a vehicle, for securing a sufficient capacity of a drainage path without producing a wind-cutting sound, even when the width of the outer face of the pillar is restricted.

Therefore, the present invention provides a drip molding (e.g., a drip molding 10 or 110 in the embodiments explained later) for a vehicle, supported by a pillar (e.g., a front pillar 2 or 102 in the embodiments) at a corner of the front or back of a body of the vehicle, so as to drain waterdrops entering a side edge of a windowpane (e.g., a front windowpane 6 in the embodiments) on the front or back side of the vehicle, the drip molding comprising:

an attachment base (e.g., an attachment base 26 or 126 in the embodiments) attached to the pillar;

a glass pane sealing part (e.g., a glass pane sealing part 28 in the embodiments) for sealing a gap between the attachment base and the side edge of the windowpane; and a furnishing lip part (e.g., a furnishing lip part 27 in the embodiments) having a canopy shape, extending from the attachment base to a front surface of the windowpane, so as to form a drainage path (e.g., a drainage path 29 in the embodiments) between the furnishing lip part and the windowpane, wherein on the outside of the furnishing lip part, a bent surface (e.g., a bent surface 31 in the embodiments) is arranged so as to form an arc shape bending toward the front surface of the windowpane; and an inner face of the furnishing lip part is formed in a manner such that the larger a distance from a head toward a root of the furnishing lip part, the larger a distance between this inner face and the front surface of the windowpane.

In accordance with the above structure, the bent surface on the outside of the furnishing lip part forms an arc shape bending toward the front surface of the windowpane, and thus functions as a current adjusting surface for an air current flowing from the front surface of the windowpane toward the relevant side of the vehicle body. Therefore, even when the width of the outer face of the pillar is restricted, it is possible to reliably suppress a wind-cutting sound, similar to the case in which the width of the pillar is increased.

In addition, the larger the distance from the head toward the root of the furnishing lip part, the larger the distance between the inner face of the furnishing lip part and the front surface of the front windowpane; thus, the drainage path has a sufficient capacity. Therefore, in accordance with the present invention, it is possible to simultaneously: (i) secure a sufficient capacity of the drainage path; and (ii) prevent the occurrence of a wind-cutting sound.

In a typical example:

the glass pane sealing part is made of a soft material;

at a position where the attachment base and the pillar are put in close contact with each other, a member (e.g., a sealing lip part 30 in the embodiments) made of a soft material is also arranged between the attachment base and the pillar; and the other parts of the drip molding are made of a hard material.

Accordingly, the drip molding can be put in close contact with the windowpane via the flexible glass pane sealing part, and the attachment base and the pillar can be put in close contact with each other via the flexible member, that is, the drip molding can be reliably put in close contact with the windowpane and the pillar. Additionally, in accordance with the other parts made of a hard material, the shape of the drip molding can be reliably maintained. Therefore, the furnishing lip part which forms the current adjusting surface and the drainage path can be accurately arranged between the pillar and the windowpane.

In a preferable example, the pillar includes an outer panel (e.g., an outer panel 12 in the embodiments) having a protruding portion (e.g., a protruding portion 18 in the embodiments) exposed to the outside of the vehicle, and the attachment base is attached to a side face (e.g., a front side face 18b in the embodiments) of the outer panel.

In another preferable example, the bent surface is arranged so as to form an arc shape bending from an outer face of the pillar toward the front surface of the windowpane.

In these cases, the outside of the furnishing lip part can form the bent surface together with the outer face of the pillar; thus, also in these cases, the bent surface can function as the current adjusting surface for an air current flowing from the front surface of the windowpane toward the relevant side of the vehicle body.

DETAILED DESCRIPTION OF THE INVENTION

Hereinafter, an embodiment in accordance with the present invention will be described with reference to the appended figures. In the following explanation, the terms "front" and "back" are defined with respect to the direction in which a vehicle runs, unless another specific explanation thereof is added.

Figure 1:
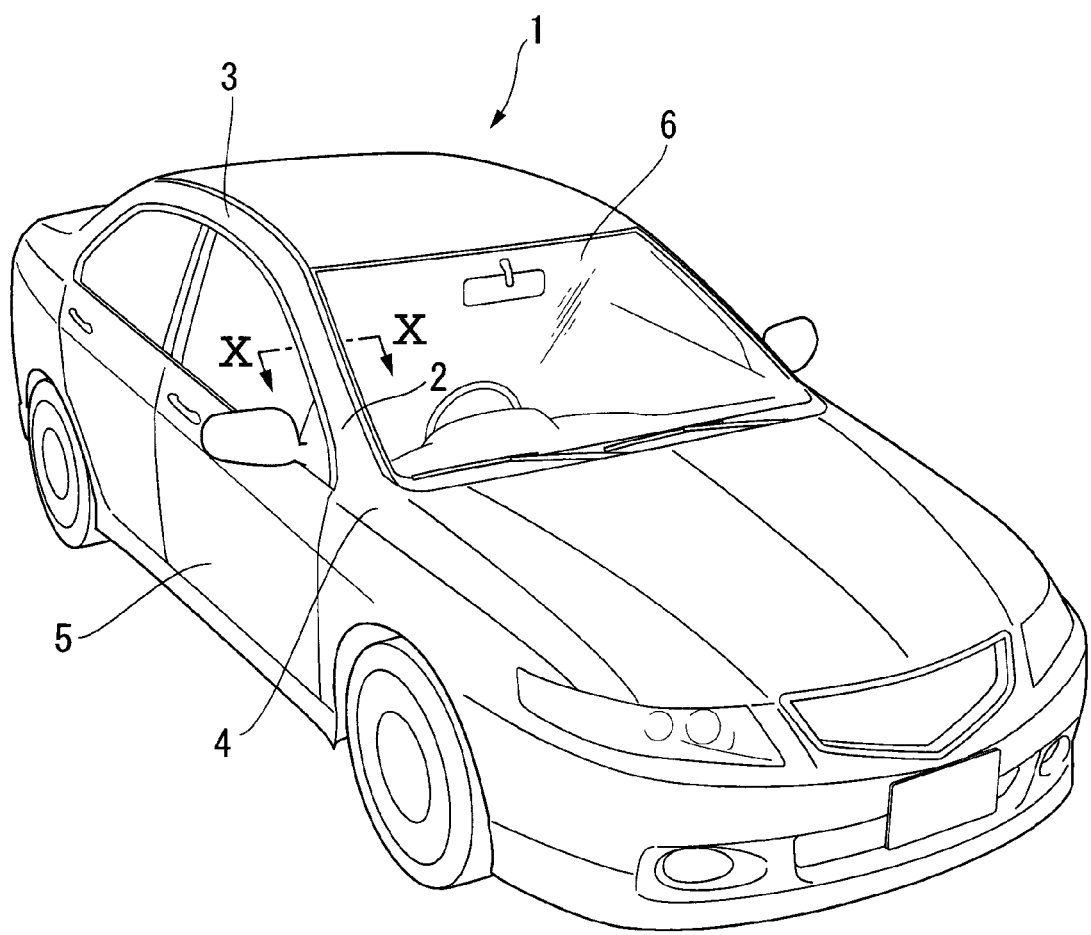
FIG. 1 is a perspective view of a vehicle so as to show an embodiment in accordance with the present invention.

In the present embodiment, a drip molding 10 for a vehicle 1, in accordance with the present invention, is installed between a front pillar 2 and a front windowpane 6 (see FIG. 1).

As shown in FIG. 1, the front pillar 2 couples a roof side part 3 and a front body side part 4 of the vehicle 1 to each other, and forms part of a side opening of the vehicle body, which is closed or opened using a front door 5. The front pillar 2 also supports a side edge of the front windowpane 6.

Figure 2:
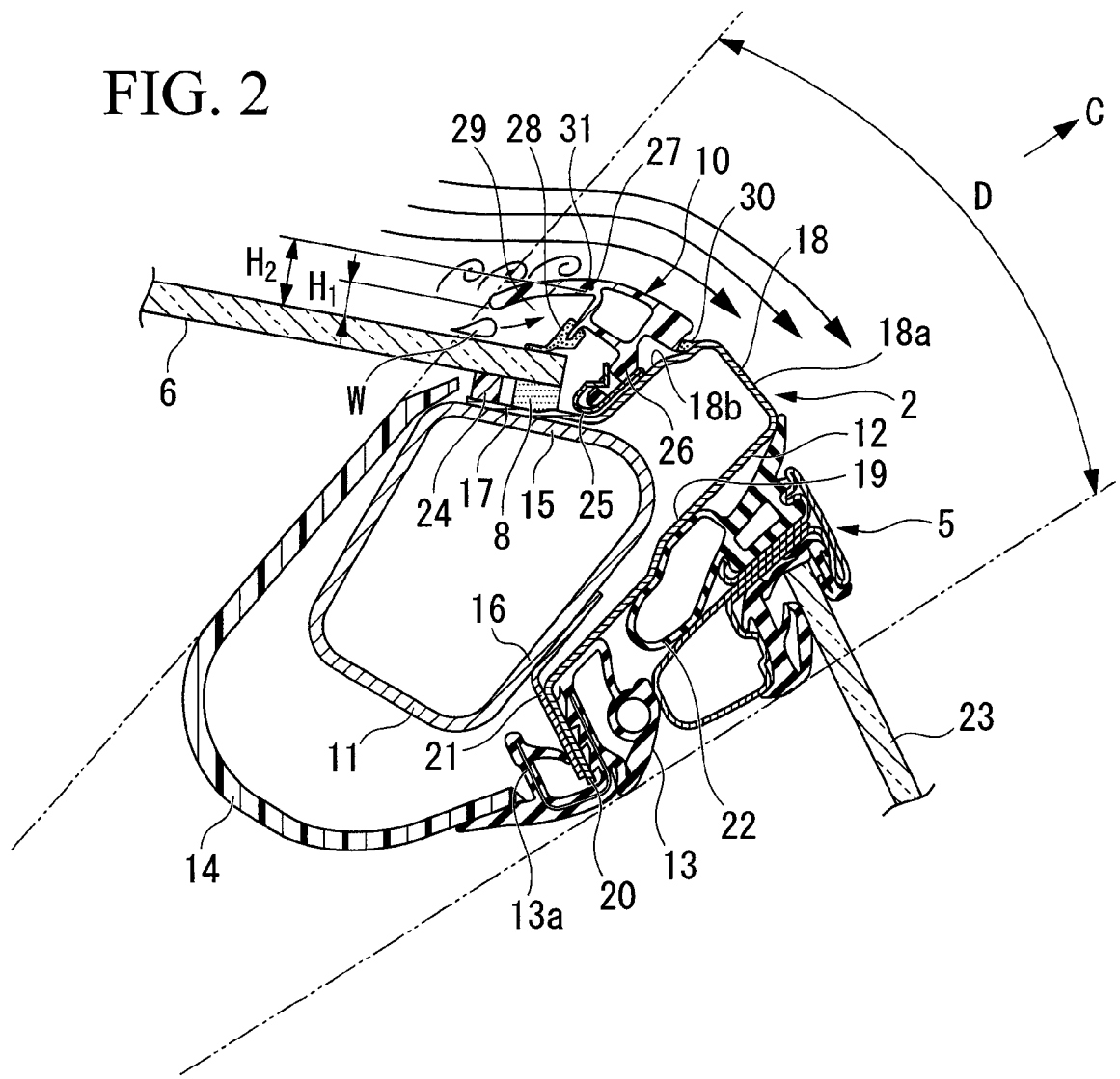
FIG. 2 is a sectional view along line X-X in FIG. 1 so as to show the embodiment.

As shown in the sectional view of FIG. 2, the front pillar 2 has a hollow member 11 made of metal; an outer panel 12 made of metal, attached to a side of the hollow member 11 toward the outside of the vehicle; a body-side weather strip 13 which is put in close contact with the front edge (i.e., a door sash part) of the front door 5 when the door is closed; and an interior finishing panel 14 which is attached to a side of the hollow member 11 toward the inside of the vehicle, and thus faces the interior of the vehicle. The outer panel 12 is formed in a manner such that an integral body is formed from the roof side part 3 to the front body side part 4.

In order to secure desired rigidity and impact performance, the hollow member 11 is integrally molded by hydroform molding so as to produce a trapezoidal section and thus a closed section shape which improves the rigidity of the front pillar 2.

In FIG. 2, when arrow C indicates the line of sight of the driver, a front side wall of the hollow member 11 with respect to the direction of arrow C is called a "front wall 15", and a wall toward the front door 5, which is joined to the front wall 15, is called a "door side wall 16". The above-described outer panel 12 is attached over the front wall 15 and the door side wall 16. The hollow member 11 is longer along the direction of arrow C, in comparison with the horizontal width.

The outer panel 12 has a base part 17 overlapped and fastened to the front wall 15 of the hollow member 1, a protruding portion 18 extending from the base part 17 so as to form an expanded portion having a U-shape section, the top of which forms an outer exposed face 18a toward the outside of the vehicle; an opening-side wall 19 extending from the other end (i.e., opposite to the base part 17) of the protruding portion 18 toward the interior of the vehicle, so as to form a part of an opening of the vehicle body; and a flange portion 20 formed by bending an end portion of the opening-side wall 19. The flange portion 20 is welded and fastened to a support panel 21 having a substantially L-shape, which is welded and fastened to the door side wall 16 of the hollow member 11.

The body-side weather strip 13 has a welt part 13a which is fastened to the joint portion of the support panel 21 and the flange portion 20 so as to interpose the joint portion.

The interior finishing panel 14 is attached to the hollow member 11 using clips (not shown), and a door weather strip 22 of the front door 5 is put in close contact with the opening-side wall 19 of the outer panel 12 when the front door 5 is closed. In FIG. 2, reference numeral 23 indicates a door pane supported at the front door in a freely ascendable or descendable manner.

As discussed above, in the front pillar 2 of the present embodiment, the outer panel 12 having a narrow exposed face (18a) toward the outside of the vehicle is attached to the front wall 15 of the hollow member 11, the depth of which is longer than the width thereof, thus, range D (see FIG. 2), in which the vision of the driver is interrupted, is narrow.

Figure 3:
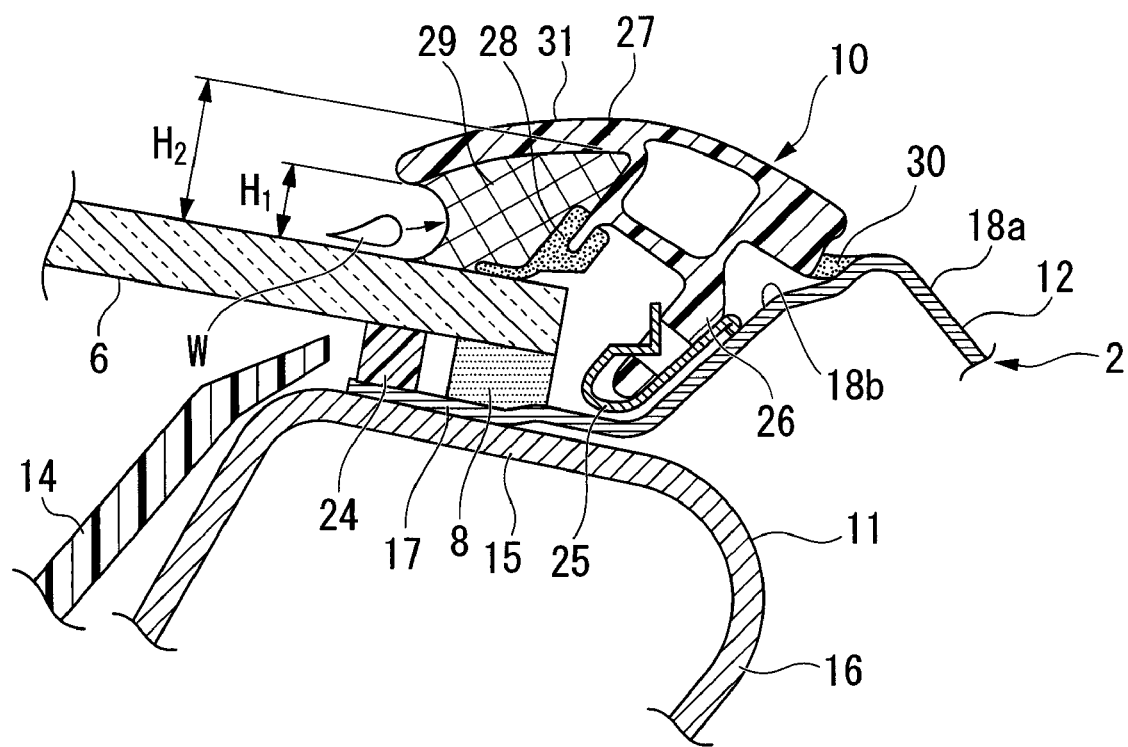
FIG. 3 is an enlarged view of a main part in FIG. 2 so as to show the embodiment.

Each side edge of the front windowpane 6 is overlapped to the top surface of the base part 17 of the outer panel 12, and is adhered via an adhesive 8 in this state. The end face of each side edge of the front windowpane 6 faces a front side face 18b of the protruding portion 18 of the outer panel 12 via a specific gap therebetween. A plurality of metal clips 25 are attached to this front side face 18b at intervals along the length of the front side face 18b (i.e., along the height of the vehicle body). The drip molding 10 in accordance with the present invention is attached using the clips 25. In FIGS. 2 and 3, reference numeral 24 indicates a dumb rubber which prevents projection of the adhesive and also functions as a spacer.

The drip molding 10 has an attachment base 26 which is attached to the front side face 18b of the outer panel 12; a furnishing lip part 27 which projects from the attachment base 26 toward the front surface of the front windowpane 6 so as to form a canopy; and a glass pane (i.e., windowpane) sealing part 28 extending from the attachment base 26 towards the front surface of the relevant side edge of the front windowpane 6 so that its head is put in close contact with the front surface of the front windowpane 6. The line from the root of the furnishing lip part 27 to the head of the glass pane sealing part 28 is continuously formed via the attachment base 26, so that a drainage path 29 is formed between the front windowpane 6 and the inner surface of the furnishing lip part 27 so as to drain raindrops or the like which enter the side edge of the front windowpane 6.

In addition, a sealing lip part 30 made of a soft material (e.g., a sponge rubber) is provided at the attachment base 26 in the vicinity of the outer exposed face 18a of the outer panel 12, in a manner such that it is put in close contact with the front of a side face of the outer panel 12. In the drip molding 10, in addition to this sealing lip part 30, the glass pane sealing part 28 is also made of a similar soft material, and the other parts are made of a hard resin.

As shown in FIG. 3, the root of the furnishing lip part 27 of the drip molding 10 is positioned ahead of the front surface of the front windowpane 6 while securing a specific distance therefrom. The part from the root to the head of the furnishing lip part 27 bends toward the front surface of the front windowpane 6. More specifically, the furnishing lip part 27 has a bent surface 31 on the outside thereof (i.e., on the front face side of the vehicle), so that a smooth arch is drawn from the outer exposed face 18a (i.e., the outer face) of the front pillar 2 toward the front surface of the front windowpane 6. On the other hand, the inner face of the furnishing lip part 27 is formed in a manner such that the larger the distance from the head toward the root of the furnishing lip part 27, the larger the distance between this inner face and the front surface of the front windowpane 6, that is, the larger the height of the drainage path 29. In FIGS. 2 and 3, reference symbols $H_1$ and $H_2$ respectively indicate the heights of the drainage path 29 measured at the head and the root of the furnishing lip part 27.

In accordance with the above structure, as shown in FIG. 3, a waterdrop (or raindrop) W entering the side edge of the front windowpane 6 when the vehicle runs in the rain or the like is guided along the drainage path 29 and is drained below the bottom of the vehicle body. In the drainage path 29 formed by the drip molding 10, the larger the distance from the head toward the root of the furnishing lip part 27, the larger the height of the drainage path 29. Therefore, even when a large number of waterdrops W enter the side edge of the front windowpane 6, no overflowing occurs and the waterdrops can be reliably drained below the vehicle.

On the other hand, when an air current hits the front surface of the front windowpane 6 during the running of the vehicle, a part of the air current may tend to separate from the vehicle body due to a step (i.e., a gap) between the front windowpane 6 and the head of the furnishing lip part 27 (see FIG. 2). However, at the outside of the furnishing lip part 27 of the drip molding 10, the bent surface 31 is formed which draws an arc from the outer exposed face 18a (i.e., the outer face) of the front pillar 2 toward the front surface of the front windowpane 6, and this bent surface 31 functions as a current adjusting surface having a sufficient width, which is joined to the outer face of the front pillar 2. Therefore, it is possible to reliably suppress the separation of the air current occurring at the head of the furnishing lip part 27, by using the current adjusting surface.

In addition, the drip molding 10 includes the furnishing lip part 27 having an arc shape formed from the root to the head thereof, so as to bend toward the front windowpane 6, and the distance between the front windowpane 6 and the head of the furnishing lip part 27 is small. Therefore, it is possible to considerably reduce the occurrence of separation of the air current itself.

Accordingly, the vehicle of the present embodiment has a structure providing a wide visible range to the driver by reducing the horizontal width of the front pillar 2 as discussed above, and also secures a sufficient amount of drainage discharge using the drip molding 10 while suppressing a wind-cutting sound due to a separation of the air current during the running of the vehicle.

Furthermore, in the drip molding 10, the sealing lip part 30 and the glass pane sealing part 28 are each made of a soft material, and the other parts are made of a hard material. Therefore, the shape of the furnishing lip part 27 can be reliably maintained while the sealing lip part 30 and the glass pane sealing part 28 are respectively reliably put in contact with the outer panel 12 and the front windowpane 6. Therefore, the furnishing lip part 27 can be accurately provided at a specific position between the front pillar 2 and the front windowpane 6.

Figure 4:
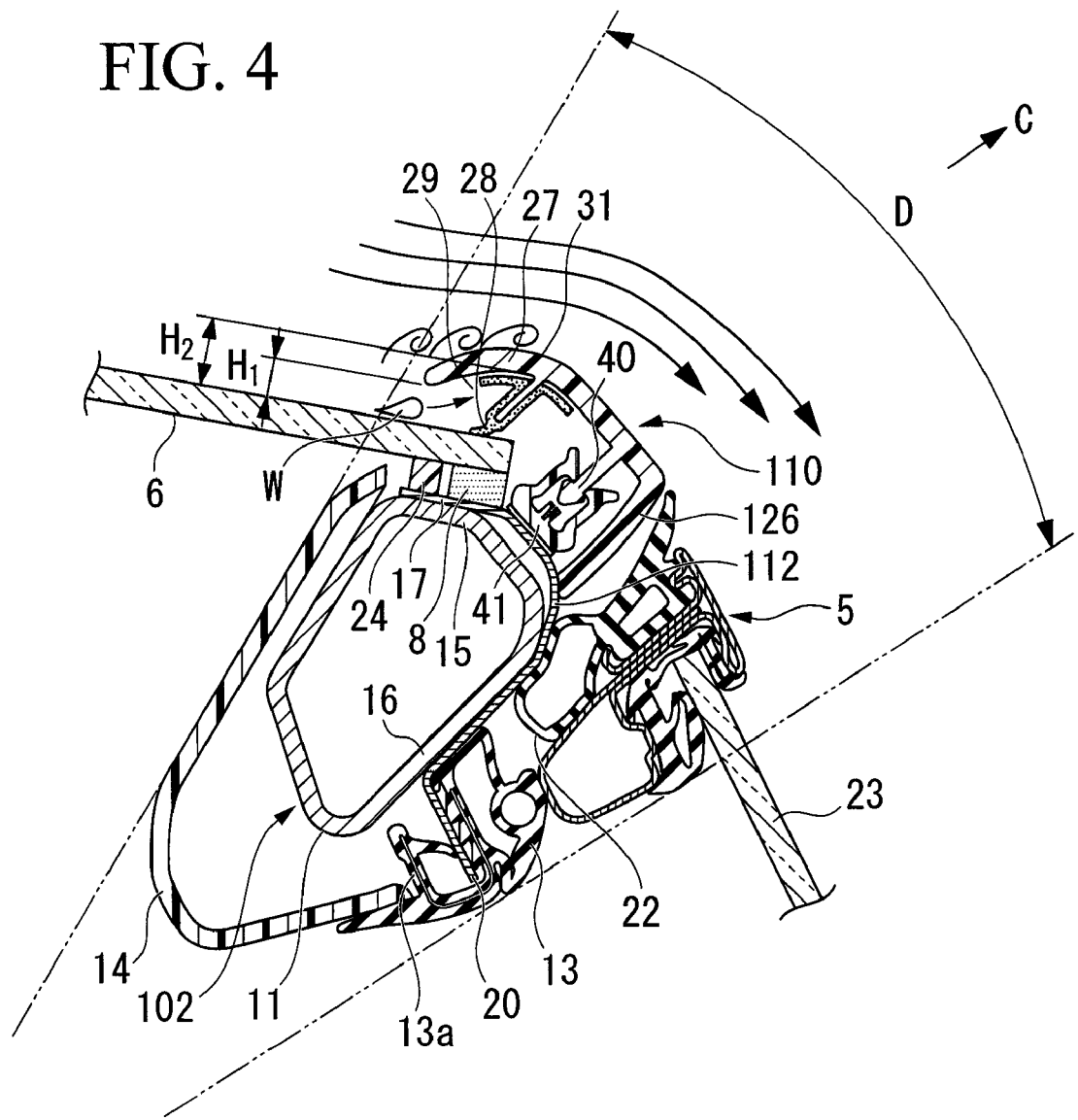
FIG. 4 is a sectional view similar to FIG. 2, so as to show another embodiment in accordance with the present invention.

FIG. 4 shows another embodiment of the present invention. In FIG. 4, parts identical to those of the previous embodiment are given identical reference numerals.

The present embodiment employs a front pillar 102 and a drip molding 110 which respectively differ from the front pillar 2 and the drip molding 10 of the previous embodiment. Specifically, an outer panel 112 of the front pillar 102 has no protruding portion exposed toward the outside of the vehicle. The drip molding 110 has an attachment base 126 having a larger molded body so that the attachment base 126 forms a part of the opening of the vehicle body. In addition, a fittable protrusion 40 is provided on the back surface of the drip molding 110 at the position facing the top face of the outer panel 112. This fittable protrusion 40 is engaged with a recessed portion 41 provided at the top face of the outer panel 112, thereby attaching the attachment base 126 to the outer panel 112.

In this embodiment, the other structural elements and the relevant functions are almost similar to those of the previous embodiment. However, the outer panel 112 is not exposed to the outside of the vehicle at all; thus, the visible range for the driver can be further widened.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, the above embodiments each employ a drip molding arranged between the front pillar and the front windowpane; however, the drip molding in accordance with the present invention may be arranged between a rear pillar and a rear windowpane.

What is claimed is:

1. A drip molding for a vehicle, supported by a pillar at a corner of the front or back of a body of the vehicle, so as to drain waterdrops entering a side edge of a windowpane on the front or back side of the vehicle, said pillar having a width dimension and a depth dimension and defining a range, which extends horizontally, over which a driver's field of vision is interrupted, the drip molding comprising:
   an attachment base attached to the pillar and disposed within the range so as to be concealed from a driver's view;
   a glass pane sealing part for sealing a gap between the attachment base and the side edge of the windowpane; and
   a furnishing lip part having a canopy shape, extending from the attachment base to a front surface of the windowpane, so as to form a drainage path between the furnishing lip part and the windowpane, said furnishing lip part being contained within the range so as to be concealed from the driver's view while extending toward an edge of the range, wherein
   the pillar includes an outer panel having a protruding portion exposed to the outside of the vehicle, and the attachment base is attached to a side face of the outer panel;

the outer panel is arranged close to a door of the vehicle so that the furnishing lip part extends from the attachment base to the edge of the range;

on the outside of the furnishing lip part, a bent surface is arranged so as to form an arc shape bending toward the front surface of the windowpane, said bent surface being curved so as to provide an air flow-adjustment effect; and an inner face of the furnishing lip part is arc-shaped such that a distance from the inner face to the front surface of the windowpane gradually and continuously increases from a head toward a root of the furnishing lip part, whereby sufficient space is provided by the drainage path between the inner face of the furnishing lip part and the windowpane to efficiently guide waterdrops that enter said drainage path, wherein:

the glass pane sealing part is made of a soft material;

at a position where the attachment base and the pillar are put in close contact with each other, a member made of a soft material is also arranged between the attachment base and the pillar; and the other parts of the drip molding are made of a hard material.

2. The drip molding in accordance with claim 1, wherein the arc-shaped bent surface bends from an outer face of the pillar toward the front surface of the windowpane.

3. A drip molding for a vehicle, supported by a pillar at a corner of the front or back of a body of the vehicle, so as to drain waterdrops entering a side edge of a windowpane on the front or back side of the vehicle, said pillar having a width dimension and a depth dimension and defining a range, which extends horizontally, over which a driver's field of vision is interrupted, the drip molding comprising:

an attachment base attached to the pillar and disposed within the range so as to be concealed from a driver's view;

a glass pane sealing part for sealing a gap between the attachment base and the side edge of the windowpane; and a furnishing lip part having a canopy shape, extending from the attachment base to a front surface of the windowpane, so as to form a drainage oath between the furnishing lip cart and the windowpane, said furnishing lip part being contained within the range so as to be concealed from the driver's view while extending toward an edge of the range, wherein the pillar includes an outer panel having a protruding portion exposed to the outside of the vehicle, and the attachment base is attached to a side face of the outer panel;

the outer panel is arranged close to a door of the vehicle so that the furnishing lip part extends from the attachment base to the edge of the range;

on the outside of the furnishing lip part, a bent surface is arranged so as to form an arc shape bending toward the front surface of the windowpane, said bent surface being curved so as to provide an air flow-adjustment effect; and an inner face of the furnishing lip part is arc-shaped such that a distance from the inner face to the front surface of the windowpane gradually and continuously increases from a head toward a root of the furnishing lip part, whereby sufficient space is provided by the drainage path between the inner face of the furnishing lip part and the windowpane to efficiently guide waterdrops that enter said drainage path, wherein the pillar is a hollow member formed integrally to have a closed cross section, comprising:

a front surface supporting the windowpane, wherein said windowpane is fixed to said front surface such that said windowpane is disposed relatively forward of said hollow member; and first and second side surfaces extending rearwardly from said front surface;

a door seal, mounted on the first side of surface of the hollow member at a location that is spaced relatively rearwardly from the front surface, whereby the door seal and a door sash, which is provided on the first side of the hollow member and adapted to engage the door seal, overlap each other; and an outer member mounted over the front surface and at least one side surface of the hollow member so as to cover the hollow member from the door seal to the windowpane.

* * * * *

UNITED STATES PATENT AND TRADEMARK OFFICE
CERTIFICATE OF CORRECTION

| | |
|---|---|
| PATENT NO. | : 7,360,825 B2 |
| APPLICATION NO. | : 11/538951 |
| DATED | : April 22, 2008 |
| INVENTOR(S) | : Junichi Yoshioka et al. |

It is certified that error appears in the above-identified patent and that said Letters Patent is hereby corrected as shown below:

Column 7, Line 43 (Claim 3, Line 16) delete "oath" and insert --path--.

Signed and Sealed this

Twenty-ninth Day of July, 2008

JON W. DUDAS
*Director of the United States Patent and Trademark Office*